(12) United States Patent
Wu et al.

(10) Patent No.: US 9,035,667 B2
(45) Date of Patent: May 19, 2015

(54) AUTOMATIC TESTING EQUIPMENT, AUTOMATIC TESTING SYSTEM AND METHOD FOR CONTROLLING AUTOMATIC TESTING THEREOF

(75) Inventors: Shi-Ping Wu, New Taipei (TW); Chang-Hao Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 292 days.

(21) Appl. No.: 13/454,436

(22) Filed: Apr. 24, 2012

(65) Prior Publication Data

US 2013/0033276 A1     Feb. 7, 2013

(30) Foreign Application Priority Data

Aug. 3, 2011    (CN) .......................... 2011 1 0220728

(51) Int. Cl.
    *G06F 11/273*      (2006.01)
(52) U.S. Cl.
    CPC ................................. *G06F 11/2733* (2013.01)
(58) Field of Classification Search
    CPC ........ G01R 31/00; G01R 31/04; G01R 31/06; G01R 31/08; G06F 11/267; G06F 11/2733
    USPC .................................................... 324/750.01
    See application file for complete search history.

(56) References Cited

U.S. PATENT DOCUMENTS

| | | | |
|---|---|---|---|
| 2003/0137651 A1* | 7/2003 | DeCusatis et al. | 356/73.1 |
| 2004/0178815 A1* | 9/2004 | Ou et al. | 324/755 |
| 2005/0056520 A1* | 3/2005 | Seagle et al. | 194/239 |
| 2007/0126441 A1* | 6/2007 | Mochizuki et al. | 324/754 |
| 2012/0146675 A1* | 6/2012 | Lai et al. | 324/750.16 |

FOREIGN PATENT DOCUMENTS

| | | |
|---|---|---|
| CN | 2449238 Y | 9/2001 |
| TW | 200613708 | 5/2006 |
| TW | 200726011 | 7/2007 |
| TW | 201013189 | 4/2010 |
| TW | 201013189 A * | 4/2010 |

* cited by examiner

*Primary Examiner* — Tung X Nguyen
*Assistant Examiner* — Son Le
(74) *Attorney, Agent, or Firm* — Muncy, Geissler, Olds & Lowe, P.C.

(57) ABSTRACT

An automatic testing equipment, an automatic testing system, an a method for controlling automatic testing thereof are disclosed. The automatic testing equipment is used for receiving a control signal to test a durability of a connecting port of a device under test (DUT). The automatic testing equipment includes a testing platform, a testing unit, and a power control unit. The testing platform is used for disposing the DUT. The testing unit includes a main body, an assembly unit, and a height adjustment unit. The assembly unit is used for assembling a test connector. The height adjustment unit is connected with the main body and works with the assembly unit to adjust a height of the assembly unit. The power control unit drives the testing unit to test the connecting port via the test connector after receiving the control signal.

13 Claims, 6 Drawing Sheets

AUTOMATIC TESTING EQUIPMENT, AUTOMATIC TESTING SYSTEM AND METHOD FOR CONTROLLING AUTOMATIC TESTING THEREOF

BACKGROUND OF THE INVENTION

1. Field of the Invention

The present invention relates to an automatic testing equipment, an automatic testing system, and a method for controlling the automatic testing equipment and system, and more particularly, to an automatic testing equipment, an automatic testing system, and a method for controlling the automatic testing equipment and system which can automatically test a device under test (DUT) and record a test history.

2. Description of the Related Art

Various electronics products emerge in our daily life and comprise a variety of connecting ports which are fitting in with specifications such as USB, network connection terminals, audio jacks, video terminals, HDMI, or IEEE 1394. Users tend to plug and pull these connecting ports frequently, thus it is important for electronics product manufacturers to test and verify the durability of these connecting ports before shipping out their products. In prior art techniques, these connecting ports are plugged and pulled several times manually by technicians to test their durability. However, this kind of process is time consuming and labor intensive, and is also inefficient to do so.

In another embodiment of the prior art, a testing equipment can use a pneumatic means to automatically plug and pull a device under test (DUT). Although the testing equipment can test the DUT automatically, it is still necessary to dismantle and then assemble a testing unit of the testing equipment to adjust a height and a position of the testing unit before doing a new test. Therefore, it is complicated to perform a new test and to adjust the testing unit. Besides, the prior art testing equipment can't be controlled by a computer system to receive instructions and record a test process automatically, which means a technician must perform some of the tasks in the test process manually, so the prior art testing equipment fails to save labor.

Therefore, it is necessary to provide an automatic testing equipment, an automatic testing system, and a method for controlling the automatic testing equipment and system to test the DUT in a more convenient and automatic way to solve the problem of the prior art techniques.

SUMMARY OF THE INVENTION

It is an object of the present invention to provide an automatic testing equipment which can automatically test a device under test (DUT).

It is another object of the present invention to provide an automatic testing system which can automatically record a test history of the DUT.

It is still another object of the present invention to provide a method for controlling the automatic testing equipment and the automatic testing system of the present invention.

In order to achieve the above objects, the present invention provides an automatic testing equipment for receiving a control signal to test a durability of a connecting port of a device under test (DUT). The automatic testing equipment comprises a testing platform, a testing unit, and a power control unit. The testing platform disposes the DUT. The testing unit comprises a main body, an assembly unit, and a height adjustment unit. The assembly unit makes contact with the main body to assemble a test connector. The test connector is fitting in with the connecting port. The height adjustment unit is connected to the main body and cooperates with the assembly unit to adjust a height of the assembly unit. The power control unit is connected to the testing unit, the power control unit drives the testing unit to test the connecting port via the test connector after receiving the control signal.

The automatic testing system tests a durability of a connecting port of a device under test (DUT). The automatic testing system comprises a computer system, a controller, and the automatic testing equipment. The computer system generates a control parameter. The controller is electrically connected to the computer system for receiving the control parameter. The controller comprises a buffer module and a control module. The buffer module stores the control parameter. The control module is electrically connected to the buffer module to generate a control signal according to the control parameter. The automatic testing equipment is electrically connected to the controller for receiving the control signal. The automatic testing equipment comprises the testing platform, the testing unit, and the power control unit. The testing platform disposes the DUT. The testing unit comprises the main body, the assembly unit, and the height adjustment unit. The assembly unit is connected to the main body to assemble a test connector. The test connector is fitting in with the connecting port. The height adjustment unit is connected to the main body and cooperates with the assembly unit to control the elastic element to adjust a height of the assembly unit. The power control unit is connected to the testing unit; the power control unit drives the testing unit to test the connecting port via the test connector after receiving the control signal and stores a test history in the buffer module via the controller, wherein the test history is to be read by the computer system.

The present invention provides a method for controlling automatic testing, comprising the following steps: providing an automatic testing equipment for disposing a DUT; generating a control parameter by a computer system; generating a control signal by the controller according to the control parameter; driving a testing unit by a power control unit according to the control signal to automatically test the connecting port; and storing a test history.

DETAILED DESCRIPTION OF THE PREFERRED EMBODIMENT

The advantages and innovative features of the invention will become more apparent from the following detailed description when taken in conjunction with the accompanying drawings.

Figure 1:
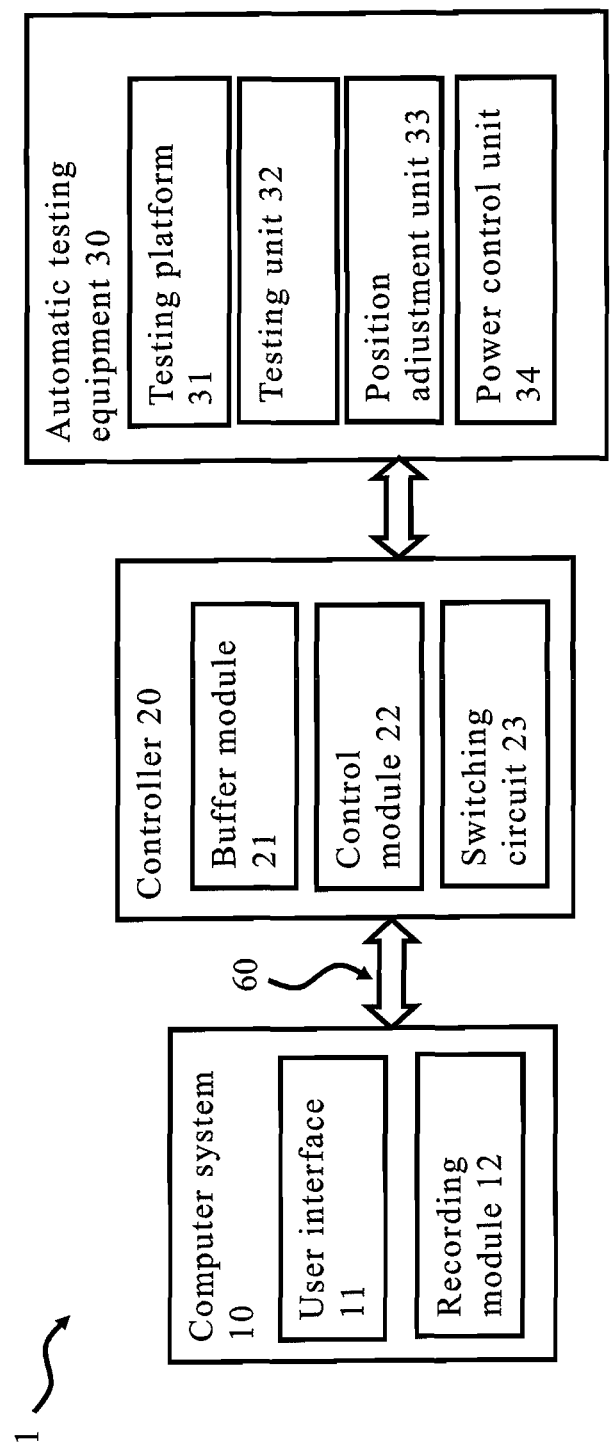
FIG. 1 illustrates a structural view of an automatic testing system of the present invention.

Please refer to FIG. 1 for a structural view of an automatic testing system of the present invention.

Figure 2A:
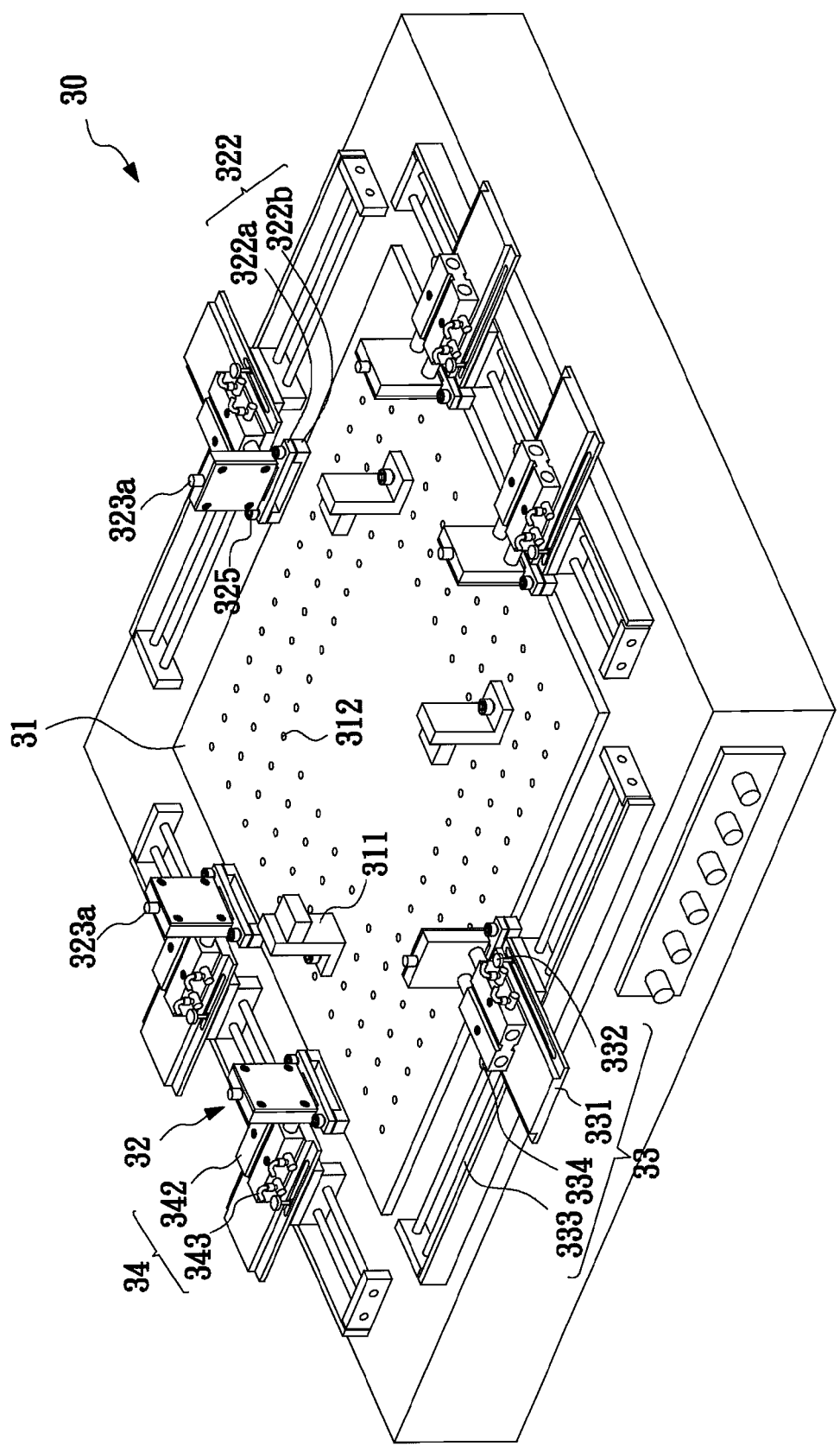
FIG. 2A illustrates an exterior view of the automatic testing equipment of the present invention.
Figure 2B:
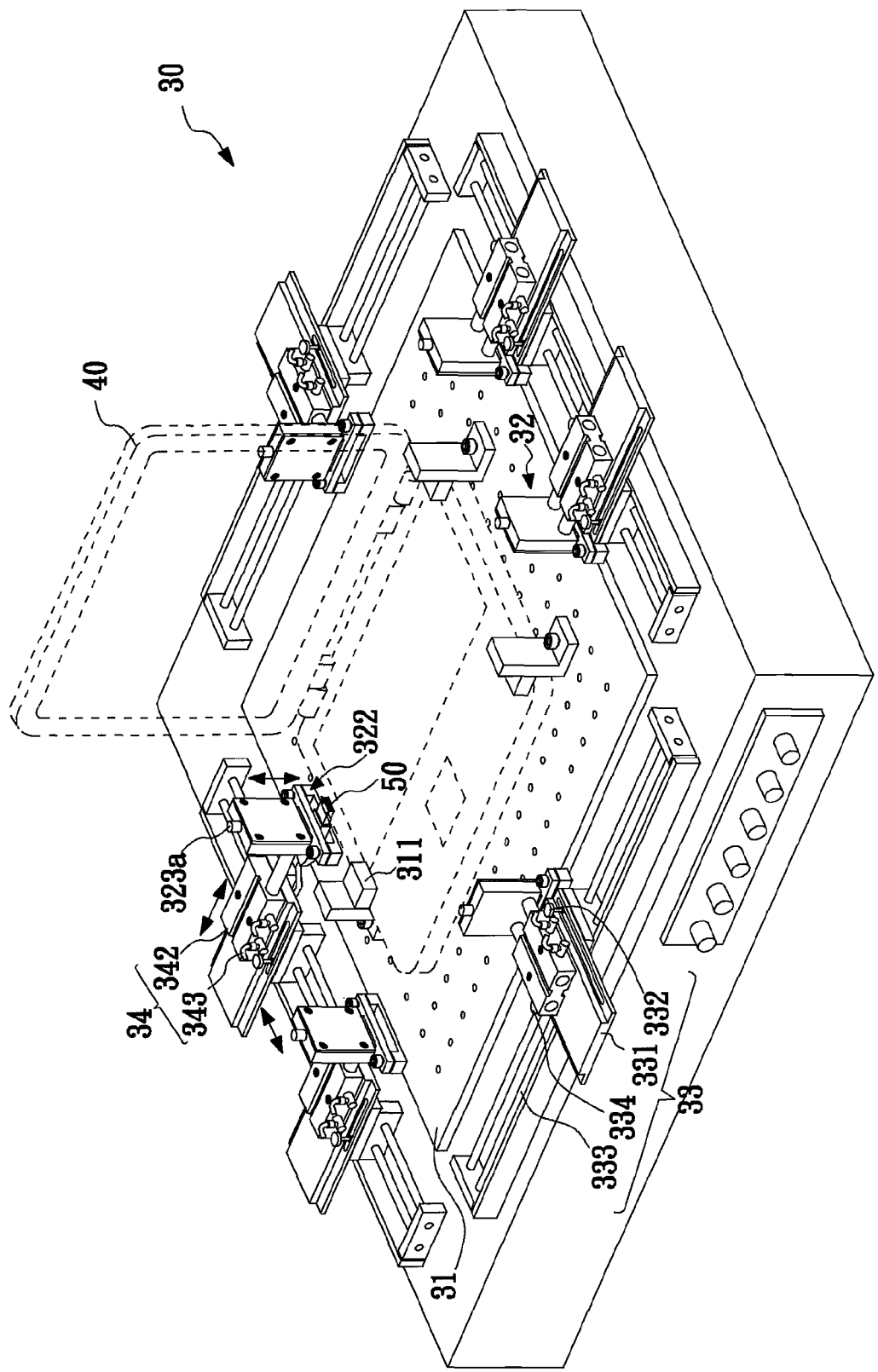
FIG. 2B illustrates a view of the automatic testing equipment connecting with a DUT.

The present invention provides an automatic testing system 1 which can automatically test a durability of a connecting port of a DUT 40 (as shown in FIG. 2B). The DUT 40 can be a notebook PC, a tablet PC, a mobile phone, or any other electronics products having a connecting port. However, the present invention can also test other kinds of connecting ports. In an embodiment of the present invention, the automatic testing system 1 comprises a computer system 10, a controller (such as a single chip microcontroller) 20, and an automatic testing equipment 30.

The computer system 10 can be a desktop PC, a notebook PC, or any other kinds of systems. The computer system 10 comprises a user interface 11 and a recording module 12. The user interface 11 is constructed by a software for a user to set up a control parameter, wherein the control parameter can be used to choose one of the testing units 32 in the automatic testing equipment 30 to perform the test process or to set up the frequencies of plugging/pulling of the DUT 40, or the control parameter can be used to control other test related functions. The computer system 10 can use the control parameter to control the automatic testing equipment 30. The recording module 12 can record the control parameter and a test history of the automatic testing equipment 30 for the user to read later. Besides, the recording module 12 can record a serial number of the DUT 40, the name of the connecting port, a test time/date, or so on.

The controller 20 can be a single-chip microcomputer implemented in a hardware structure and electrically connected to a serial data communication interface 60 and a computer system 10 to receive a control parameter. The serial data communication interface 60 can be RS232. The controller 20 comprises a buffer module 21, a control module 22, and a switching circuit 23. The buffer module 21 is implemented in a hardware structure to store the control parameter transmitted by the computer system 10. The control module 22 can be implemented in a hardware structure or a hardware structure combining firmware. The control module 22 is electrically connected to the buffer module 21 to generate a control signal according to the control parameter stored in the buffer module 21.

It is noted that a signal comparing process is performed between the computer system 10 and the controller 20 to avoid signal transmission error. Particularly, when the computer system 10 is a notebook computer, the computer system 10 can electrically connect the USB port to the serial data communication interface 60 (such as RS232) for signal transmission. In this case, a possible signal conversion problem could lead to transmission error. Therefore, when the controller 20 receives the control parameter, the controller 20 can send a contact signal back to the computer system 10 via a half duplex communication channel or the like. When the computer system 10 determines that a content of the contact signal matches the control parameter, then the controller 20 generates the control signal. Since this process is known in the art, therefore it will not be further described for the sake of brevity.

The switching circuit 23 is implemented in a hardware structure and electrically connected to the control module 22 to control the power control unit 34 of the automatic testing equipment 30 according to the control signal so as to let the automatic testing equipment 30 tests the DUT 40 automatically.

Figure 1A:
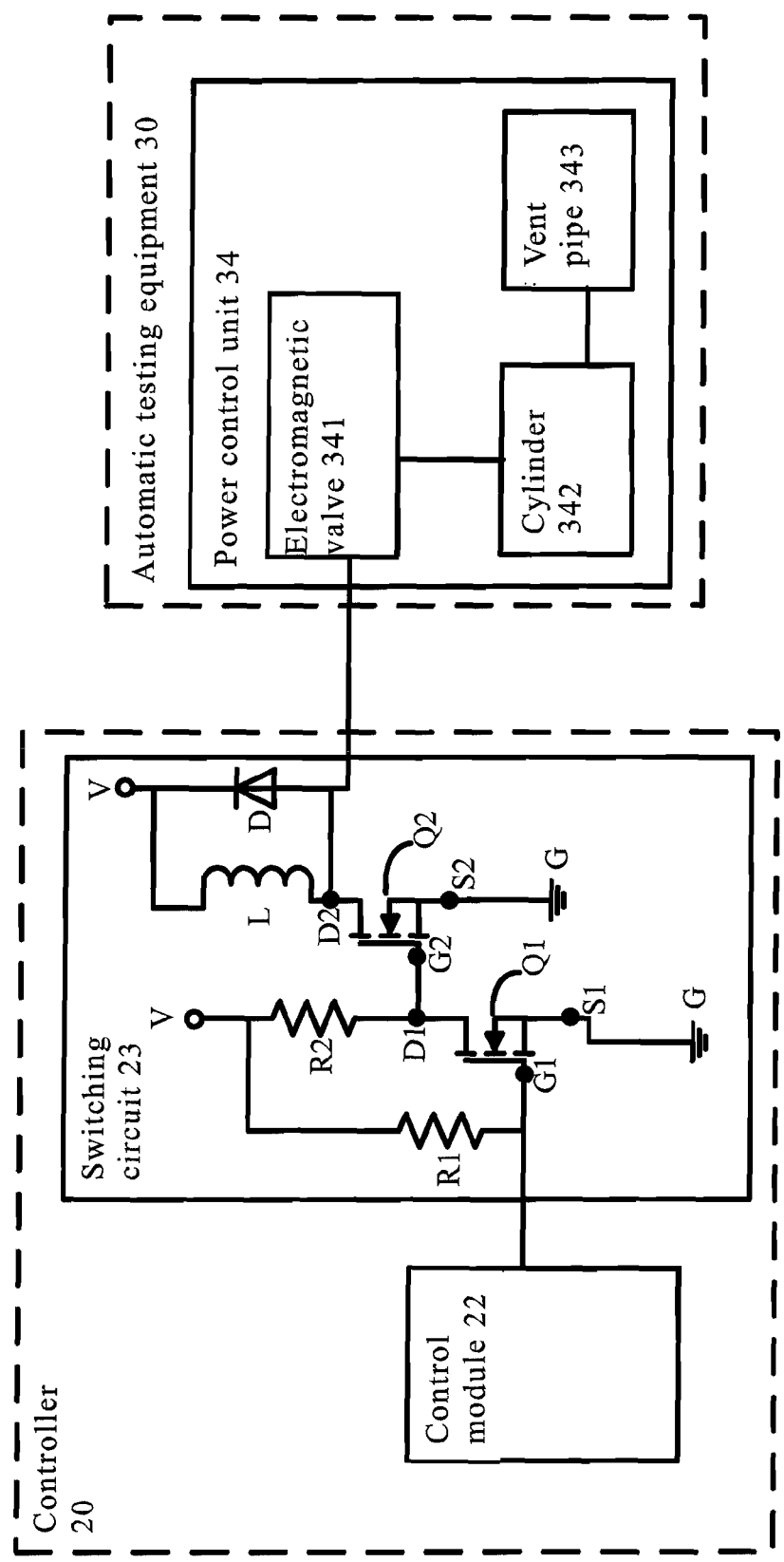
FIG. 1A illustrates a circuit diagram inside a controller of the present invention.

Please refer to FIG. 1A for the circuit diagram of the controller illustrating how the switching circuit 23 controls the power control unit 34.

In this embodiment, the power control unit 34 can drive the testing unit 32 pneumatically. The power control unit 34 comprises an electromagnetic valve 341, a cylinder 342, and a vent pipe 343, the cylinder 342 is connected to the electromagnetic valve 341 and the testing unit 32, and the cylinder 342 communicates with the vent pipe 343. The switching circuit 23 can comprise a first transistor Q1, a second transistor Q2, and other circuit components such as resistors R1, R2, an inductor L, and the diode D1; wherein these circuit components mutually connect to each other. The resistors R1, R2, the inductor L, and the diode D perform voltage regulating and rectifying function, since they are widely adopted and known in the art, therefore, their operating principles will not be further described.

The first transistor Q1 and the second transistor Q2 can be regarded as a switch module. In this embodiment, the first transistor Q1 and the second transistor Q2 are metal-oxide-semiconductor field effect transistors (MOSFET), or any other kinds of transistors. The first transistor Q1 has a source terminal S1, a drain terminal D1 and a gate terminal G1. Similarly, the second transistor Q2 has a source terminal S2, a drain terminal D2, and a gate terminal G2. The source terminal S1 and source terminal S2 are electrically connected to the ground terminal G, the drain terminal D1 and drain terminal D2 are electrically connected to the power input V, the gate terminal G1 is electrically connected to the control module 22, the drain terminal D1 is electrically connected to gate terminal G2, and then drain terminal D2 is also electrically connected to the electromagnetic valve 341 of the power control unit 34.

When the control module 22 outputs a control signal having a high voltage level, which will turn on the first transistor Q1 and pull down the voltage level of drain terminal D1 to a low voltage level, which will also pull down the voltage level of the gate terminal G2 of the second transistor Q2 to cut off the second transistor Q2. Therefore, the drain terminal D2 remains its high voltage level to turn off the electromagnetic valve 341. On the other hand, when the control module 22 outputs a control signal having a low voltage level, which will cut off the first transistor Q1 and pull up the voltage level of the drain terminal D1 to the high voltage level, which will also pull up the voltage level of the gate terminal G2 of the second transistor Q2 to turn on the second transistor Q2. Therefore, the drain terminal D2 drops to the low voltage level to turn on the electromagnetic valve 341.

Since the switching modes of the first transistor Q1 and the second transistor Q2 are widely adopted and known in the art, they will not be further described. It is noted that the switching circuit 23 is not limited to the circuit structure shown in FIG. 1A, the switching circuit 23 can have any other kinds of circuit structure as long as it can turn on/off the electromagnetic valve 341.

As described above, the control module 22 outputs control signals having high or low voltage levels to turn on/off the electromagnetic valve 341, which in turn uses the pressurized air provided by the vent pipe 343 to drive the cylinder 342, thereby controlling operations of the testing unit 32. Meanwhile, the control module 22 can use a plurality of switching circuits 23 to control operations of a corresponding number of testing units 32.

The automatic testing equipment 30 is electrically connected to the controller 20 to test the DUT 40 according to the control signal. The automatic testing equipment 30 comprises a testing platform 31, the testing unit 32, a position adjustment unit 33, and the power control unit 34.

Please refer to FIG. 2A to FIG. 2B for detailed structures of the automatic testing equipment 30, wherein 2A illustrates an exterior view of the automatic testing equipment 30; and FIG. 2B illustrates a view of the automatic testing equipment 30 connecting with the DUT 40.

In an embodiment of the present invention, the testing platform 31 of the automatic testing equipment 30 is provided for disposing the DUT 40, and a positioning device 311 is used for fixing the DUT 40 to the testing platform 31. A plurality of positioning openings 312 can be disposed on the testing platform 31, wherein the positioning device 311 can be mounted on any positioning opening 312 according to the specification or size of the DUT 40 to fix the DUT 40 to the testing platform 31. However, the DUT 40 can be fixed to the testing platform 31 with any other fixing means.

The automatic testing equipment 30 can have one or more testing units 32 and can have any number of testing units 32 according to requirements. The testing unit 32 is provided for disposing a test connector 50, which is fitting in with the connecting port of the DUT 40. The testing unit 32 is connected to the cylinder 342 of the power control unit 34 to have the connecting port plugged or pulled along with the movements of the cylinder 342. The structure of the testing unit 32 will be described later.

The position adjustment unit 33 is connected to the cylinder 342 of the power control unit 34 to adjust positions of the cylinder 342 and the testing unit 32 connected to the cylinder 342 at the same time, thereby allowing the testing unit 32 to correspond with a position of the connecting port of the DUT 40. The position adjustment unit 33 comprises a first track 331, a first fixing element 332, a second track 333, and a second fixing element 334. The cylinder 342 of the power control unit 34 is disposed on the first track 331 to drive the testing unit 32 to slide along the first direction. The first fixing element 332 cooperates with the first track 331. When the cylinder 342 slides on the first track 331 to a fixed point, the first fixing element 332 fixes the first track 331 to let the testing unit 32 stay fixed at the fixed point. Meanwhile, the first track 331 is disposed on the second track 333 and is substantially perpendicular to the second track 333 with a part of the first track 331 overlapping with the second track 333. The cylinder 342 and the first track 331 can slide together on the second track 333 along the second direction. Since the first track 331 is substantially perpendicular to the second track 333, therefore, the first direction is substantially perpendicular to the second direction. The second fixing element 334 is connected to the first track 331 and cooperates with the second track 333 to fix the first track 331 to a position, thereby fixing the testing unit 32 to the fixed point. Hence, the position adjustment unit 33 can slide on the tracks to conveniently adjust a position of the testing unit 32.

Figure 3:
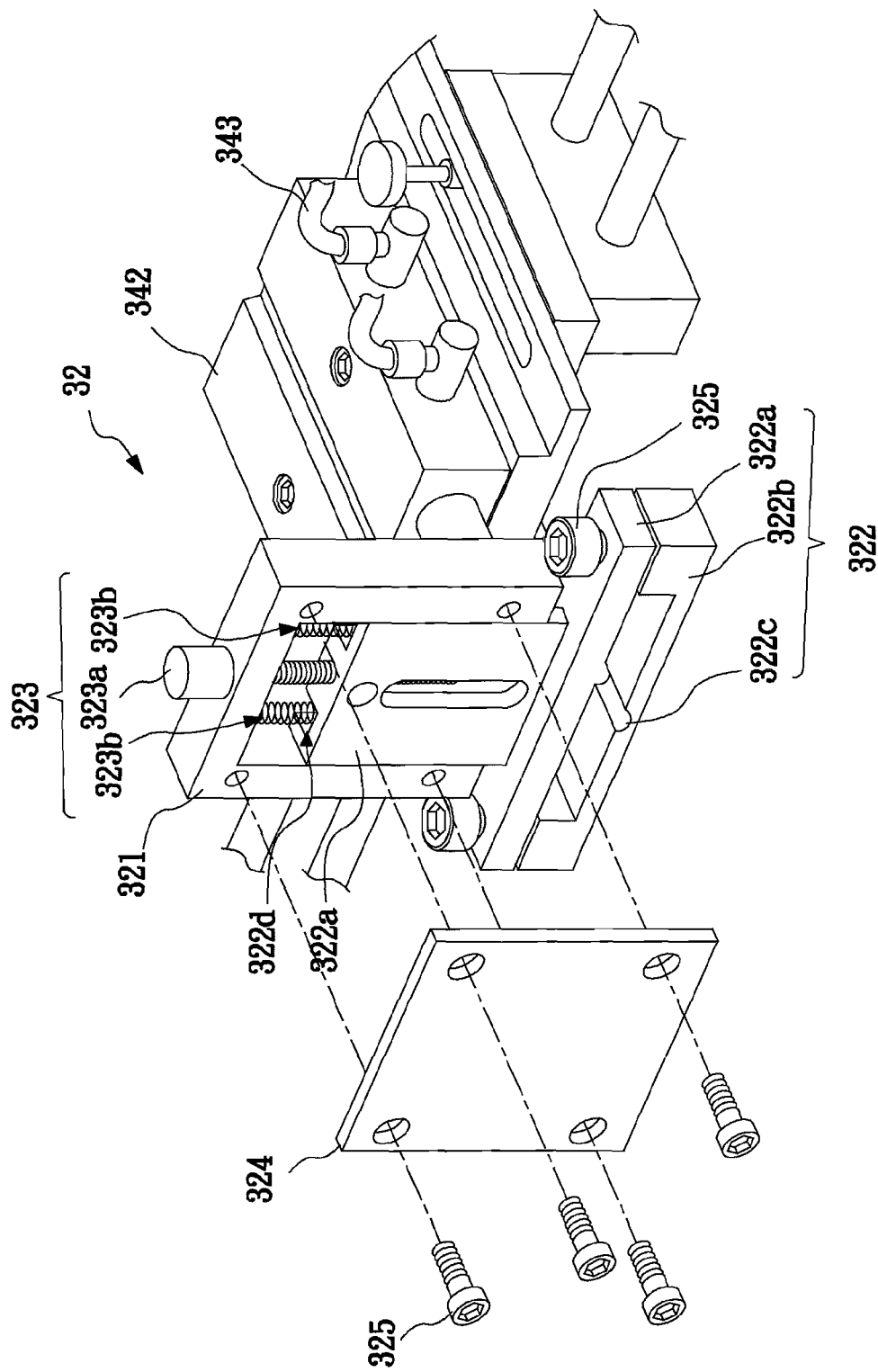
FIG. 3 illustrates a structural view of a testing unit of the present invention.

FIG. 3 illustrates a structural view of a testing unit of the present invention.

In this embodiment, the testing unit 32 comprises a main body 321, an assembly unit 322, a height adjustment unit 323, and a housing 324. The assembly unit 322 cooperates with the main body 321 and makes contact with the main body 321 to assemble test connector 50. The assembly unit 322 comprises a first assembly element 322a and a second assembly element 322b; the first assembly element 322a is connected to the main body 321, the second assembly element 322b is formed in a U shape. When the first assembly element 322a and the second assembly element 322b combine, a gap between the first assembly element 322a and the second assembly element 322b clamps and holds the test connector 50, then at least one fastening element 325 is used for fastening the first assembly element 322a and the second assembly element 322b with each other. When test connector 50 is formed in a flat and rectangular shape, such as USB, network connection termi-nals, HDMI or other video terminals, the first assembly element 322a and the second assembly element 322b can clamp and hold the test connector 50 directly. If the test connector 50 is formed in a circular shape, such as an audio jack, a recess 322c of the second assembly element 322b can be used to clamp the test connector 50. The shape of the recess 322c corresponds to that of the test connector 50 to help the first assembly element 322a and the second assembly element 322b clamp the test connector 50 more stably.

The height adjustment unit 323 is connected to the main body 321 and cooperates with the assembly unit 322. The height adjustment unit 323 comprises a rotating element 323a and an elastic element 323b. The rotating element 323a can be a long screw going through the main body 321 and the first assembly element 322a, wherein the first assembly element 322a comprises a corresponding screw thread (not shown) to cooperate with the rotating element 323a. The elastic element 323b is connected to the main body 321 and is placed in a containing portion 322d of the first assembly element 322a. When the rotating element 323a rotates, the elastic element 323b helps to adjust a height of the assembly unit 322. For example, when the rotating element 323a rotates downward along the screw thread of the first assembly element 322a, the first assembly element 322a moves up relatively. When the rotating element 323a rotates upward along the screw thread of the first assembly element 322a, an elasticity of the elastic element 323b helps the first assembly element 322a move downward.

Finally the testing unit 32 can cover a part of the main body 321, the assembly unit 322, and the height adjustment unit 323 with the housing 324 and uses the fastening element 325 to fix the housing 324 onto the main body 321. Therefore the appearance of the testing unit 32 can look pleasing and integrated.

As described above, in this embodiment, the testing unit 32 can conveniently adjust the height of the test connector 50 with the height adjustment unit 323, and uses the position adjustment unit 33 to adjust a position of the testing unit 32 so as to be fitting in with the specification and the size of the DUT 40.

Consequently, the control module 22 outputs the control signal to turn on or off the electromagnetic valve 341 of the power control unit 34 so as to let the electromagnetic valve 341 use the pressurized air provided by the vent pipe 343 to drive the cylinder 342; thereby allowing the testing unit 32 to use the cylinder 342 to plug and pull the connecting port of the DUT 40 for multiple times until the predetermined number of times is reached. The control module 22 of the controller 20 can store a test history in the buffer module 21. The computer system 10 can read the test history from the buffer module 21 and store it in the recording module 12 for the user to analyze it.

Figure 4:
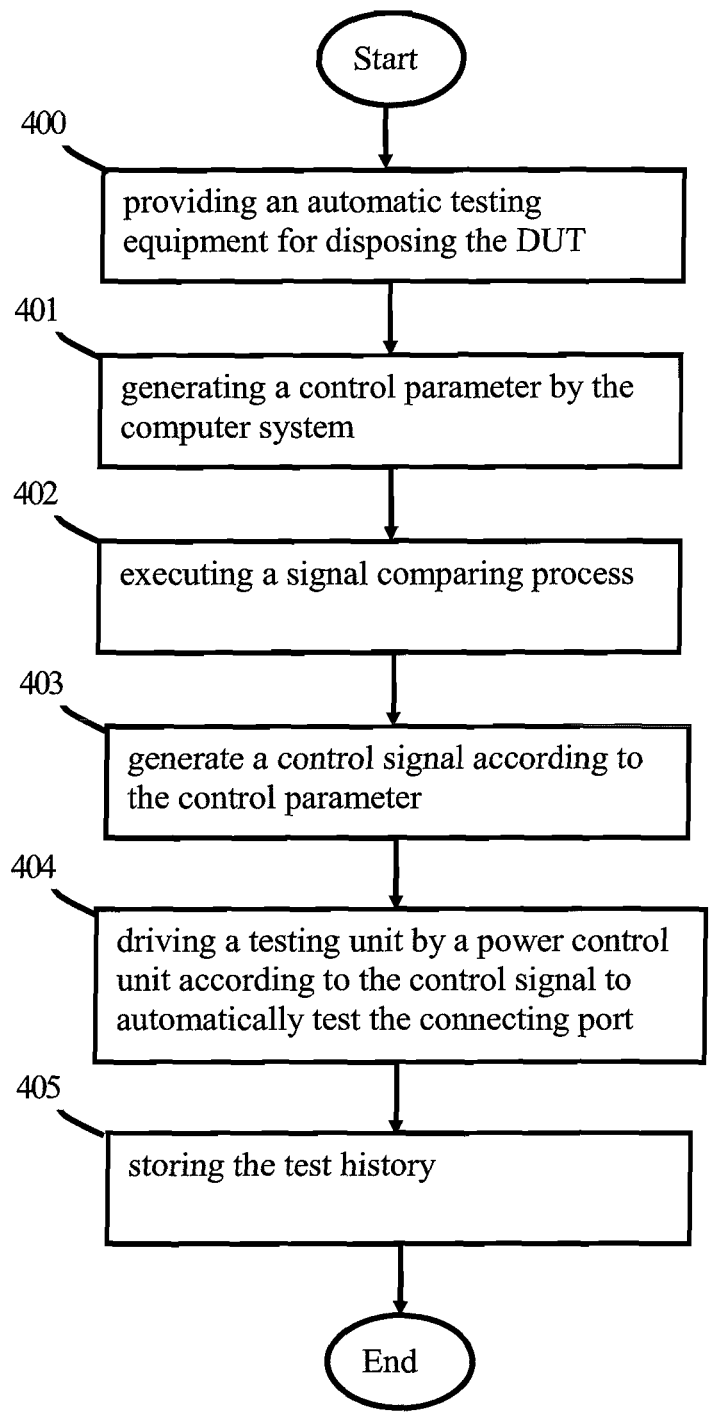
FIG. 4 illustrates a flowchart of a method for controlling automatic testing of the present invention.

Please refer to FIG. 4 for a flowchart of a method for controlling automatic testing of the present invention. It is noted that although the automatic testing system 1 having the computer system 10, the controller 20, and the automatic testing equipment 30 is illustrated to describe the present invention, the method can be applied for controlling any other devices.

First the process goes to step 400: providing an automatic testing equipment for disposing the DUT.

The automatic testing system 1 provides the automatic testing equipment 30 for disposing the DUT 40 and adjusting the position and height of the testing unit 32 to correspond with the specification of the DUT 40. The position and height adjustment of testing unit 32 has already explained and will not be further described.

Then the process goes to step 401: generating a control parameter by the computer system.

The computer system 10 provides a user interface 11 for the user to set up the control parameter. The control parameter can be used to choose one of the testing units 32 in the automatic testing equipment 30 to perform the test process or to set up the number of times the DUT 40 is plugged/pulled. The computer system 10 transmits the control parameter to the controller 20 via a serial data communication interface 60 and stores the control parameter in the recording module 12.

Then the process goes to step 402: executing a signal comparing process.

When the controller 20 initiates, it clears all the data in the buffer module 21. As the controller 20 receives the control parameter from the computer system 10, it stores the control parameter directly in the buffer module 21 and sends a contact signal back to the computer system 10 via a half duplex channel. When the computer system 10 determines that a content of the contact signal matches the control parameter, then the controller 20 proceeds to the next step.

After the signal comparing process is executed, the process goes to step 403: generate a control signal according to the control parameter.

The control module 22 of the controller 20 generates different control signals according to the control parameter stored in the buffer module 21 for different electromagnetic valves 341 and transmits the control signal to the power control unit 34 of the automatic testing equipment 30.

Then the process goes to step 404: driving a testing unit by a power control unit according to the control signal to automatically test the connecting port.

When the power control unit 34 receives the control signal, the power control unit 34 turns on or off the electromagnetic valve 341 so as to let the electromagnetic valve 341 use the pressurized air provided by the vent pipe 343 to drive the cylinder 342, thereby allowing the testing unit 32 to use the cylinder 342 to plug and pull the connecting port.

Finally the process goes to step 405: storing the test history.

The automatic testing equipment 30 transmits a number of times the DUT is plugged/pulled to the buffer module 21 of the controller 20 and stores it as a test history. Then the computer system 10 reads the test history from the buffer module 21 and stores the test history in the recording module 12.

When the automatic testing process is over, the user can observe the appearance of the DUT or tests the functionality of the connecting port in real application, and obtains a durability report of the connecting port according to the test history of the recording module 12.

It is noted that the method of the present invention can be executed in a different order as long as it achieve the object of the present invention.

Therefore, the present invention provides the automatic testing system 1 which can fully automatically test the DUT 40, and the present invention also provides the automatic testing equipment 30 which can be adjusted to conform with the specifications of each different DUT 40 and provides better capabilities than the prior art testing equipment.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An automatic testing equipment for receiving a control signal to test durability of a connecting port of a device under test (DUT), the automatic testing equipment comprising:
    a testing platform for disposing the DUT; and a testing unit comprising:
        a main body,
        an assembly unit for main contact with the main body to assemble a test connector, wherein the test connector is fitting in with the connecting port; and
        a height adjustment unit connected to the main body and cooperating with the assembly unit adjust a height of the assembly unit;
        a power control unit connected to the testing unit, the power control unit driving the testing unit to test the connecting port via the test connector after receiving the control signal; and
    a position adjustment unit connected to the power control unit to adjust a position of the testing unit, the position adjustment unit comprising:
        a first track for disposing the power control unit to let the power control unit drive the testing unit to slide along a first direction;
        a first fixing element cooperating with the first track to fix the testing unit to a fixed point;
        a second track connected to the first track for allowing the testing unit to slide along a second direction; and
        a second fixing element cooperating with the second track to fix the testing unit to the fixed point.

2. The automatic testing equipment as claimed in claim 1, wherein the height adjustment unit comprises a rotating element and an elastic element, wherein the rotating element rotates to drive the elastic element to adjust the height of the assembly unit.

3. The automatic testing equipment as claimed in claim 2, wherein the assembly unit comprises a first assembly element and a second assembly element for clamping the test connector, wherein the first assembly element and the second assembly are fastened to each other with at least one fastening element.

4. The automatic testing equipment as claimed in claim 3, wherein the first assembly element further comprises a containing portion for containing the elastic element.

5. The automatic testing equipment as claimed in claim 3, wherein the second assembly element further comprises at least one recess.

6. The automatic testing equipment as claimed in claim 1, wherein the power control unit comprises:
    an electromagnetic valve; and
    a cylinder connected to the electromagnetic valve and the testing unit, wherein the electromagnetic valve is controlled by the control signal to be turned on or off so as to drive the cylinder to activate the testing unit.

7. The automatic testing equipment as claimed in claim 1 further comprising a positioning device disposed at a positioning opening of the testing platform to fix the DUT.

8. The automatic testing equipment as claimed in claim 1, wherein:
    the height adjustment unit comprises a rotating element and an elastic element, wherein the rotating element rotates to drive the elastic element to adjust the height of the assembly unit;
    the assembly unit comprises a first assembly element and a second assembly element for clamping the test connector, wherein the first assembly element and the second assembly are fastened to each other with at least one fastening element; and the automatic testing equipment further comprises:
- a position adjustment unit connected to the power control unit to adjust a position of the testing unit; and
- a positioning device disposed at a positioning opening of the testing platform to fix the DUT.

9. An automatic testing system for testing durability of a connecting port of a device under test (DUT), the automatic testing system comprising:
- a computer system for generating a control parameter;
- a controller electrically connected to the computer system for receiving the control parameter, the controller comprising:
  - a buffer module for storing the control parameter; and
  - a control module electrically connected to the buffer module to generate a control signal according to the control parameter; and
- an automatic testing equipment electrically connected to the controller for receiving the control signal, the automatic testing equipment comprising:
  - a testing platform for disposing the DUT;
  - a testing unit comprising:
    - a main body:
    - an assembly unit connected to the main body to assemble a test connector, wherein the test connector is fitting in with the connecting port;
    - a height adjustment unit being, connected to the main body and cooperating with the assembly unit to adjust a height of the assembly unit; and
    - a position adjustment unit connected to the power control unit to adjust a position of the testing unit, the position adjustment unit comprising:
      - a first track for disposing the power control unit to drive the testing unit to slide along a first direction;
      - a first fixing element cooperating with the first track to fix the testing unit to a fixed point;
      - a second track connected to the first track for allowing the testing unit to slide along a second direction; and
      - a second fixing element cooperating with the second track to fix the testing unit to the fixed point; and
  - a power control unit connected to the testing unit, the power control unit driving the testing unit to test the connecting port via the test connector after receiving the control signal and to store a test history in the buffer module via the controller, wherein the test history is to be read by the computer system.

10. The automatic testing system as shown in claim 9, wherein the height adjustment unit comprises a rotating element and an elastic element, the rotating element rotates to drive the elastic element to adjust the height of the assembly unit.

11. The automatic testing system as shown in claim 9, wherein the controller further comprises a switching circuit electrically connected to the control module; the power control unit comprises:
- an electromagnetic valve connected to the switching circuit; and
- a cylinder connected to the electromagnetic valve and the testing unit, wherein the electromagnetic valve is controlled by the control signal to be turned on or off so as to drive the cylinder to activate the testing unit.

12. The automatic testing system as shown in claim 9, wherein the computer system further comprising:
- a user interface for a user to set up the control parameter; and
- a recording module for recording the control parameter and the test history.

13. The automatic testing system as shown in claim 9, wherein the computer system is electrically connected to the controller via a serial data communication interface.

* * * * *